US009817099B2

(12) United States Patent
Svane et al.

(10) Patent No.: US 9,817,099 B2
(45) Date of Patent: Nov. 14, 2017

(54) SYSTEM AND METHOD FOR PRECISION COLLABORATIVE TARGETING

(75) Inventors: Mark S. Svane, Tioga, TX (US); Timothy G. Brauer, Carrollton, TX (US); Nathan D. Culbertson, Melissa, TX (US)

(73) Assignee: Raytheon Company, Waltham, MA (US)

( * ) Notice: Subject to any disclaimer, the term of this patent is extended or adjusted under 35 U.S.C. 154(b) by 1446 days.

(21) Appl. No.: 12/271,481

(22) Filed: Nov. 14, 2008

(65) Prior Publication Data
US 2009/0216432 A1    Aug. 27, 2009

Related U.S. Application Data

(60) Provisional application No. 60/987,974, filed on Nov. 14, 2007.

(51) Int. Cl.
G01C 21/00 (2006.01)
G01S 3/784 (2006.01)
G01S 19/51 (2010.01)

(52) U.S. Cl.
CPC .............. *G01S 3/784* (2013.01); *G01S 19/51* (2013.01)

(58) Field of Classification Search
CPC ............................... G01S 19/51; G01S 13/931
See application file for complete search history.

(56) References Cited

U.S. PATENT DOCUMENTS 5,969,676 A * 10/1999 Tran ...................... G01S 17/023
342/13
6,323,942 B1 * 11/2001 Bamji ...................... G01C 3/08
348/E3.018
6,338,011 B1 * 1/2002 Furst ...................... G01S 7/003
342/159
6,377,211 B1 * 4/2002 Hsiung ......................... 342/359
6,535,816 B1    3/2003 Smith
(Continued)

FOREIGN PATENT DOCUMENTS

GB         2 394 376       4/2004
WO    WO-2009/064982 A1    5/2009

OTHER PUBLICATIONS

PCT Notification of Transmittal of the International Search Report and The Written Opinion of the International Searching Authority, or the Declaration, PCT/US2008/083550; dated Feb. 25, 2009, 13 pages.

(Continued)

*Primary Examiner* — Mark Holcomb
*Assistant Examiner* — Trang Nguyen
(74) *Attorney, Agent, or Firm* — Schwegman Lundberg & Woessner, P.A.

(57) ABSTRACT

A method for precision collaborative targeting includes determining information indicative of a current location and of a known remote location. A first distance is determined from the current location to the known remote location. A sensor is slewed towards an unknown remote location, the sensor being initially directed from the current location to the known remote location. The distance from the current location to the unknown remote location is measured. Information indicative of the location of the unknown remote location is determined from the amount of slewing and the distance from the current location to the unknown remote location.

11 Claims, 3 Drawing Sheets

(56) References Cited

U.S. PATENT DOCUMENTS

| | | | |
|---|---|---|---|
| 7,728,264 B2* | 6/2010 | De Sa | F41G 3/02 244/3.1 |
| 2003/0218546 A1* | 11/2003 | Lemp, III | 340/815.4 |
| 2005/0055417 A1* | 3/2005 | Reich et al. | 709/208 |
| 2005/0060092 A1* | 3/2005 | Hablani | 701/213 |
| 2005/0225854 A1* | 10/2005 | McWilliams | 359/399 |
| 2006/0238860 A1* | 10/2006 | Baun et al. | 359/429 |
| 2007/0016371 A1* | 1/2007 | Waid et al. | 701/213 |
| 2007/0050097 A1* | 3/2007 | Lo | 701/2 |
| 2007/0057840 A1* | 3/2007 | Thomas et al. | 342/357.08 |
| 2007/0103671 A1* | 5/2007 | Ash | 356/139.01 |
| 2007/0282565 A1* | 12/2007 | Bye et al. | 702/158 |
| 2008/0059071 A1* | 3/2008 | Meckauskas et al. | 702/3 |
| 2008/0163504 A1* | 7/2008 | Smith | G01C 21/20 33/268 |
| 2008/0316021 A1* | 12/2008 | Manz et al. | 340/539.13 |
| 2009/0021447 A1* | 1/2009 | Austin et al. | 343/880 |
| 2010/0013917 A1* | 1/2010 | Hanna | G06K 9/00771 348/143 |

OTHER PUBLICATIONS

Communication pursuant to Article 94(3) EPC from European Patent Office; 3 pages; dated Oct. 29, 2010 and reported Nov. 26, 2010.

"European Application Serial No. 08848589.1, Response filed May 9, 2011 to Office Action mailed Oct. 29, 2010", 15 pgs.

"European Application Serial No. 08848589.1, Amended Claims filed May 26, 2010 in response to the PCT Written Opinion", 6 pgs.

"European Application Serial No. 08848589.1, Office Action mailed Jun. 23, 2010", 2 pgs.

"European Application Serial No. 08848589.1, Response filed Jul. 30, 2010 to Office Action mailed Jun. 23, 2010", 1 pg.

"International Application Serial No. PCT/US2008/083550, International Preliminary Report on Patentability mailed May 18, 2010", 7 pgs.

* cited by examiner

*Example of Precision Collaborative Targeting with SBESS Processing Augmentation*

FIG. 5

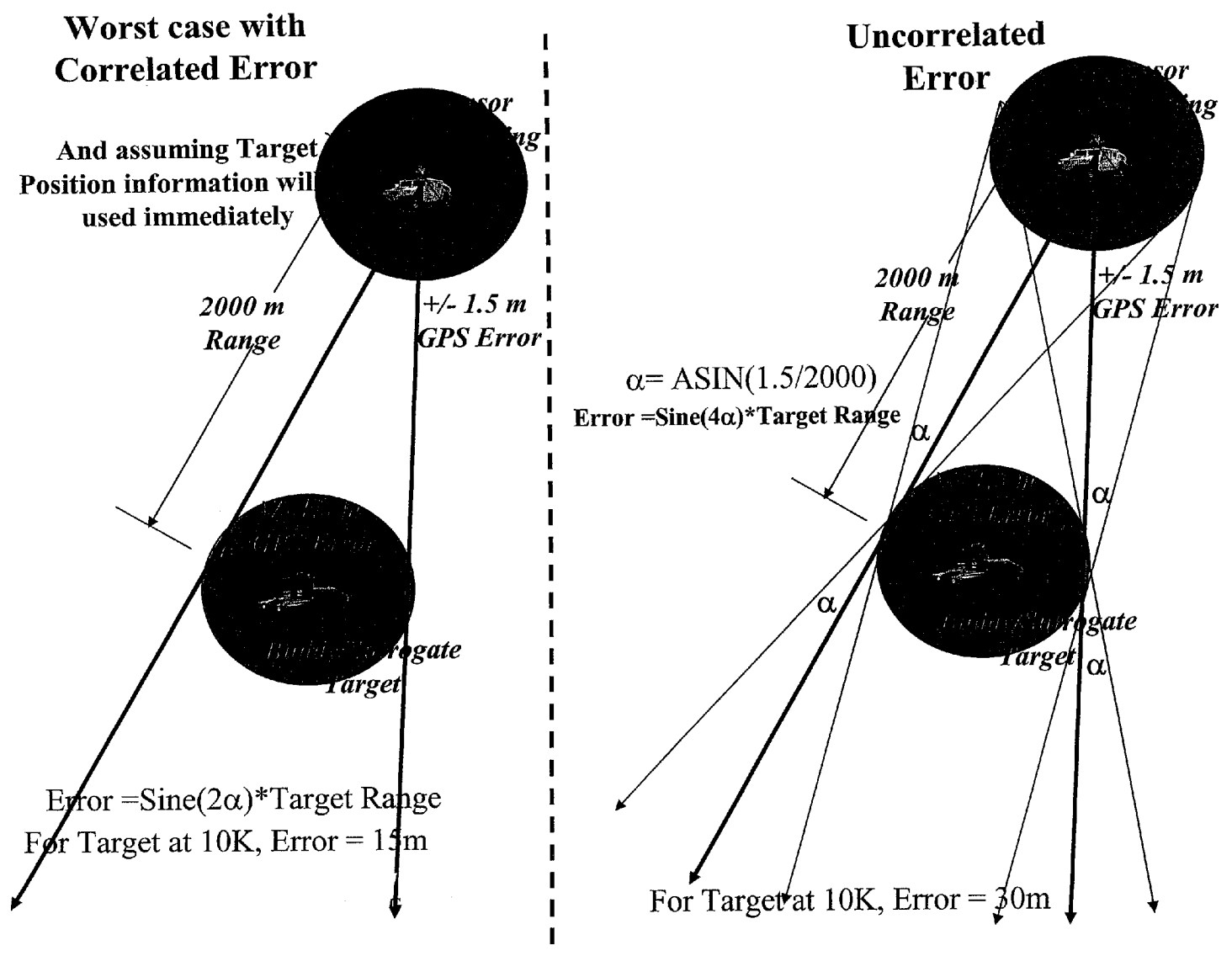

Uncorrelated Error

+/- 1.5 m GPS Error 2000 m Range

α = ASIN(1.5/2000)
Error = Sine(4α)*Target Range

For Target at 10K, Error = 30m

---

Worst case with Correlated Error

And assuming Target Position information will used immediately

+/- 1.5 m GPS Error 2000 m Range

Error = Sine(2α)*Target Range
For Target at 10K, Error = 15m

SYSTEM AND METHOD FOR PRECISION COLLABORATIVE TARGETING

CROSS REFERENCE TO RELATED APPLICATIONS

This application claims the benefit to U.S. Provisional Application No. 60/987,974, filed Nov. 14, 2007.

TECHNICAL FIELD OF THE INVENTION

This invention relates in general to precision targeting, and more particularly to a system and method for precision collaborative targeting.

BACKGROUND OF THE INVENTION

Far Target Location (FTL) sensor systems, such as the Long Range Advanced Scout Surveillance System (LRAS3) and the Improved Target Acquisition System (ITAS), are long-range sensor systems used for target detection, acquisition, and recognition. Azimuth determination error is the largest error component in the Circular Error Probability (CEP) calculation when targeting an object using an FTL sensor equipped with the GPS Interferometer Subsystem (GPSIS). The addition of expensive, external Mission Equipment Packages (MEP) consisting of Inertial Measurement Units (IMU) or North Finding Modules (e.g., gyrocompasses) and precision position pick-off measurement capability of sensor yoke to the sensor vehicle platform previously attempted and have been incorporated to try and solve this problem.

SUMMARY

From the foregoing, it may be appreciated by those skilled in the art that a need has arisen to improve accuracy of target location in a cost effective manner. In accordance with the embodiments of the present invention, a system and method for precision collaborative targeting are provided that substantially eliminate or greatly reduce disadvantages and problems associated with conventional target location systems.

According to an embodiment of the present invention, there is provided a method for precision collaborative targeting that includes determining information indicative of a current location and of a known remote location. A first distance from the current location to the known remote location is determined. A sensor is stewed towards an unknown remote location, the sensor being initially directed from the current location to the known remote location. The distance from the current location to the unknown remote location is measured. The information indicative of the location of the unknown remote location is determined from the amount of slewing and the distance from the current location to the unknown remote location.

Certain embodiments of the present invention provide various technical advantages over conventional target location systems. These technical advantages include allowing a user operating an FTL sensor to be able to more accurately determine the location of a distant target without needing to incorporate additional expensive equipment. Accordingly, by leveraging the hardware and software already installed on the FTL sensor, the user may be able to accurately determine the location of a distant target.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of particular embodiments of the present invention and the advantages thereof, reference is now made to the following description, taken in conjunction with the accompanying drawings wherein like reference numerals represent like parts, in which:

FIG. 5 illustrates a comparison between correlate and uncorrelated positioning errors.

DETAILED DESCRIPTION

Figure 1:
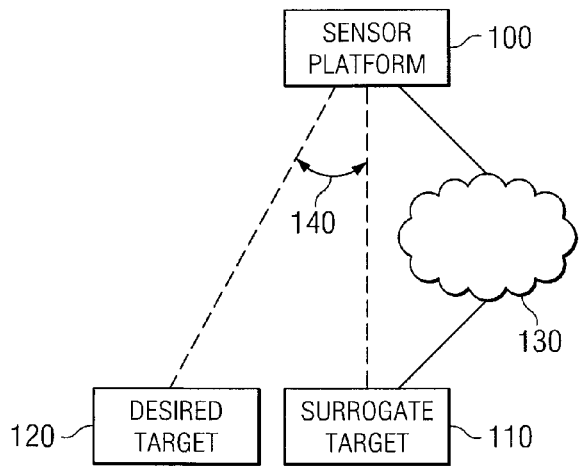
FIG. 1 illustrates a diagram showing the arrangement of a sensor platform and surrogate target for locating a desired target.

FIG. 1 illustrates a diagram showing the arrangement of a sensor platform, surrogate target, and desired target, in accordance with particular embodiment of the present invention. Particular embodiments provide the means to improve Far Target Location (FTL) accuracy of a GPS Interferometer Subsystem, which in some embodiments may comprise two GPS antennas separated by approximately 18 inches. More specifically, FTL Circular Error Probability (CEP) error may be reduced by calibrating with a known surrogate target location 110 that is of substantial distance from an FTL sensor platform 100. In particular embodiments this may be accomplished by utilizing a network of sensors 130 for sharing the GPS position of each sensor platform. Then, a viewfinder may be slewed from the surrogate target location 110 to a desired target 120 using an advanced image processing capability, such as Scene Based Electronic Scene Stabilization (SBESS), to accurately measure the azimuth angle 140 the viewfinder is slewed to get onto the desired target 120.

Some of the several possibilities for determining a known surrogate target location may include: (1) utilizing self-surveyed waypoints left along a route traveled; (2) collaborating with another sensor/vehicle via a network 130 and obtaining its accurate GPS self position; (3) locating a fixed surrogate target position on a geo-registered map; or (4) taking advantage of other precision FTL mechanisms such as the Precision Strike Suite for Special Operations Forces (PSS-SOF) used for fixed site FTL.

The amount of separation in distance of the surrogate target 110 from the sensor platform 100 may increase performance. The methodology of particular embodiments may be valid for near term targeting position determination as the methodology assumes the received GPS position errors of the sensor platform 100 and the surrogate target 110 are correlated.

Figure 2:
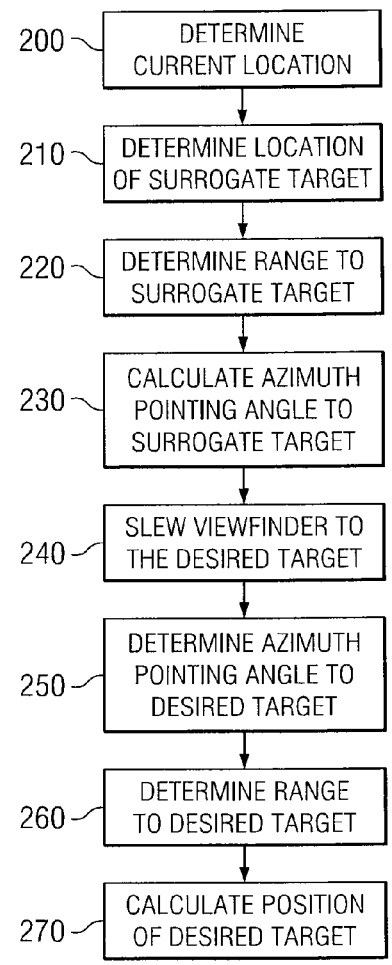
FIG. 2 illustrates a flowchart showing the steps used in determining the location of a desired target.

FIG. 2 illustrates one of the many ways in which precision collaborative targeting may be implemented. The example begins at block 200 with the determination of the current location of the sensor performing the FTL determination. The location may be determined from GPS information received by the sensor performing the FTL determination.

The sensor then determines or receives the GPS-measured position of a surrogate target at block 210. The surrogate target may include any vehicle, building, or landmark having a known GPS-measured position. In the case of a vehicle, the vehicle may pass its GPS-measured position to the sensor performing the FTL termination via a network. The network may be any suitable combination and arrangement of components supporting communications between devices. In some embodiments the information may be passed via a geo-registered map. In the case of a building or landmark, the position of the surrogate target may be determined from a map or other such device. Then the range from the sensor performing the FTL determination to the surrogate target may be determined at block 220. The range may be determined via a laser range finder. At block 230, this information may be used to calculate an accurate azimuth pointing angle to the surrogate target.

The user may then, at block 240, slew a viewfinder initially trained on the surrogate target having a known location to the desired target having an unknown location. The viewfinder may be interfaced with an imaging module (e.g., SBESS). In particular embodiments, the imaging module may, in essence, be counting the number of pixels between the surrogate target and the desired target. At block 250, the imaging module may be able to use the number of pixels to determine an accurate azimuth pointing angle from slewing the viewfinder from the surrogate target to the desired target. The determination of the azimuth may be performed real-time (e.g., as the user slews the viewfinder) or once the user stops slewing the viewfinder. The user may then determine the range to the desired target at block 260. For example, the user may use a laser range finder to determine the range to the desired target.

This information may then be used to accurately calculate a precise GPS position of the desired target at block 270. More specifically, by using the location and range to the surrogate target and the azimuth angle and range to a desired target having an unknown location, the FTL sensor may be able to determine the location of the desired target.

Some of the steps discussed with respect to FIG. 2 may be combined, modified, or deleted where appropriate and additional steps may also be added. Additionally, steps may be performed in any suitable order without departing from the scope of particular embodiments.

Gathering and determining the data needed to perform the FTL determination and performing the FTL determination may involve a combination of hardware, software, and computer logic encoded on a computer readable medium. The hardware may include at least a processor, an interface, and a viewfinder. Some embodiments may further include memory. The components may be coupled together in such a way that they may provide any necessary communications, data, instructions and/or processing capabilities to provide the above identified functionality. In addition, any of these components may be provided as separate external components or located within a common entity or device where appropriate. Particular embodiments contemplate great flexibility in the arrangement of these elements as well as their internal components.

Figure 3:
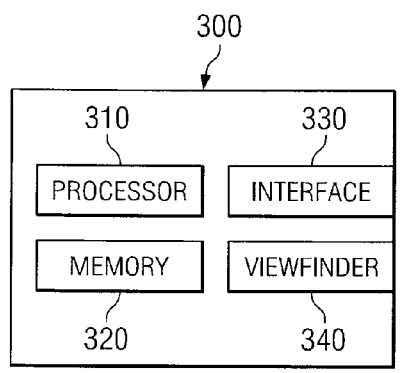
FIG. 3 illustrates a block diagram of some of the components of a device operable to provide precision targeting.

FIG. 3 illustrates a block diagram of some of the components of a device 300 used at sensor platform 100 operable to provide precision targeting. In particular embodiments, device 300 operable to provide precision targeting may be a component of or incorporated within a sensor capable of performing FTL determinations. Device 300 may provide all, some, or none of the functionality described above with respect to FIG. 1 and FIG. 2. Different embodiments may include all, some, or none of the components depicted in FIG. 3. Additionally, some embodiments may include different and/or additional components. Furthermore, device 300 may be a separate stand alone device or it may be incorporated into or be a part of one or more different devices (e.g., an LRAS3 or ITAS sensor). As depicted, device 300 includes processor 310, memory 320, interface 330, and viewfinder 340.

Processor 310 may be a microprocessor, controller, or any other suitable computing device, resource, or combination of hardware, software, and/or encoded logic operable to provide, either alone or in conjunction with other device 300 components (e.g., memory 320), precision targeting functionality. Such functionality may include providing various features discussed herein to a user. One feature that certain embodiments may provide may include determining the azimuth between a known location and an unknown location based on the amount of movement of a viewfinder 340. In particular embodiments the amount of movement may be determined, in essence, by counting the number of pixels between the known location and the unknown location. The pixels may be generated by an imaging algorithm, such as SBESS. By combining the coordinates or position of the known location and the range to that location, with the azimuth to the unknown location and the range to the unknown location, processor 310 may be able to determine the coordinates of the unknown location.

Memory 320 may be any form of volatile or non-volatile memory including, without limitation, magnetic media, optical media, random access memory (RAM), read-only memory (ROM), removable media, or any other suitable local or remote memory component. Memory 320 may store any suitable data or information, including software and encoded logic, utilized by device 300 in determining precise targeting data. For example, memory 320 may maintain a listing, table, or other organization of information used in determining the coordinates/positions of several known locations. Memory 320 may also store any logic needed to perform any of the functionality described herein. For example, memory 320 may store one or more algorithms that may be used to determine the azimuth angle from the number of pixels between the known location and the unknown location.

Interface 330 may comprise any hardware, software, and/or encoded logic needed to be able to send and receive information between other components, such as a surrogate target and other sensors. For example, interface 330 may receive messages indicating the location of a particular surrogate target. In particular embodiments, interface 330 may be able to send and receive Join Variable Message Format messages over a Tactical Network for Army use.

Viewfinder 340 may comprise any optical or electrical viewfinder operable to focus on or aim at another location, such as a surrogate target or an enemy target, in order to provide precision targeting. For example, the viewfinder may be interfaced with an imaging module (e.g., SBESS) in order to determine an accurate azimuth pointing angle from slewing the viewfinder from the surrogate target to the desired target. In particular embodiments, the imaging module may be counting the number of pixels between the surrogate target and the desired target for use by the processor 310 to calculate the azimuth pointing angle to the desired target.

Figure 4:
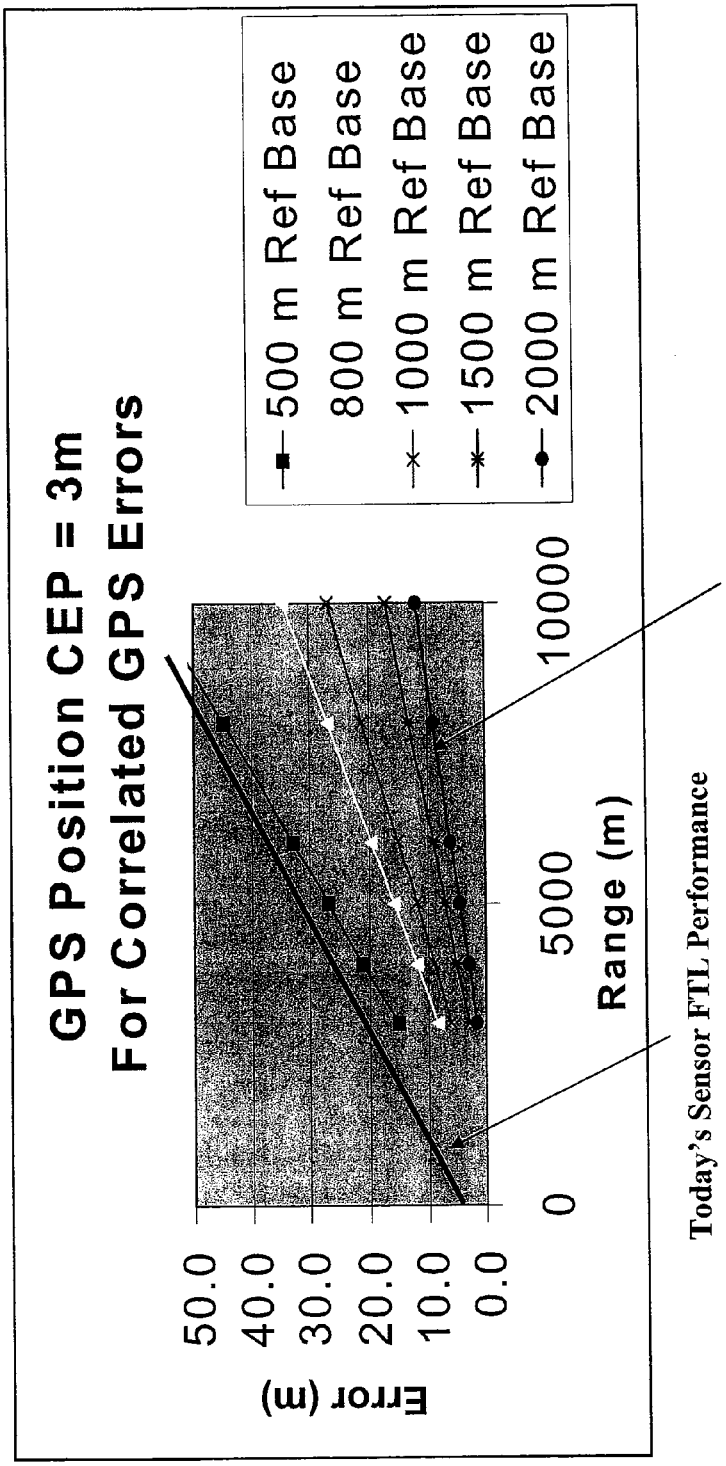
FIG. 4 illustrates a graph comparing positioning errors at different reference distances.

FIG. 4 shows a graph comparing different reference base distances for unknown target locations of various distances compared to conventional targeting systems. The embodiments of the present invention provide an improvement in accuracy for locating unknown target positions. An amount of position error is reduced as the distance from a reference base increases.

FIG. 5 shows examples where the GPS position errors of the sensor platform 100 and the known surrogate target location 110 are correlated and uncorrelated. The amount of positioning error can be reduced in half when the GPS position errors of the sensor platform 100 and the known surrogate target location 110 are correlated as opposed to being uncorrelated.

In summary, embodiments of the present invention, use a combination of networking of sensors for sharing of GPS positioning information for a targeting sensor platform and SBESS processing for measuring precise angle offset of actual target from a known collaborative target in order to determine a location of the actual target. Other embodiments in known surveyed landmarks as collaborative target positions and then SBESS to measure an angle to the actual target. Error correlation of known positions can improve accuracy.

Several different embodiments and features have been presented. Particular embodiments may combine one or more of these features depending on operational needs and/or component limitations. This may allow for great adaptability to the needs of various organizations and users. For example, a particular embodiment may use multiple surrogate targets and/or determine the position of multiple enemy targets. While various implementations and features are discussed with respect to multiple embodiments, it should be understood that such implementations and features may be combined in various embodiments. Numerous other changes, substitutions, variations, alterations, and modifications may be ascertained by those skilled in the art and it is intended that the present invention encompass all such changes, substitutions, variations, alterations, and modifications as falling within the spirit and scope of the appended claims.

What is claimed is:

1. A method for precision collaborative targeting, comprising:
    determining, by use of Global Positioning System (GPS) information received by a first sensor, a current location of the first sensor;
    receiving, over a network from a second sensor, a remote location of a surrogate target as determined from GPS information, the remote location received at the first sensor as a geo-registered map comprising the GPS information indicative of the remote location, the surrogate target comprising a vehicle operable to be mobile;
    determining, by the first sensor, a distance from the first sensor to the surrogate target in response to the current location and the remote location;
    determining, by the first sensor, first azimuth pointing angle from the first sensor to the surrogate target;
    slewing the first sensor, comprising a viewfinder having a plurality of pixels, from the surrogate target towards a desired target at an unknown remote location, the first sensor slewed by circuitry to a second azimuth pointing angle;
    counting a number of pixels in the viewfinder between the surrogate target and the desired target in real time during the slewing of the first sensor;
    determining a distance from the first sensor to the desired target;
    determining an azimuth angle between the first and the second azimuth pointing angles based on the number of pixels counted; and
    determining information indicative of a geographic position of the desired target from the azimuth angle between the first and second azimuth pointing angles and the distance from the first sensor to the desired target; wherein the position of the desired target is determined in real time during slewing of the first sensor from the distance from the first sensor to the desired target and through the use of scene based image processing circuitry at the first sensor operable to determine the azimuth angle of the first sensor from the surrogate target to the desired target.

2. The method of claim 1, wherein:
    the distance from the first sensor to the surrogate target and from the first sensor to the desired target is determined through the use of a laser range finder.

3. An apparatus for precision collaborative targeting, comprising:
    a first sensor comprising a viewfinder having a plurality of pixels and sensor processing circuitry operable to receive GPS information indicative of a current location of the apparatus, the first sensor further operable to be slewed towards a desired target at an unknown remote location, a view of the first sensor initially directed at a surrogate target, comprising a vehicle operable to be mobile and a second sensor operable to receive GPS information, at a known remote location being slewed to the desired target;
    a device operable to determine a distance from the first sensor to both the surrogate target and the desired target;
    a processor operable to determine an azimuth pointing angle between the first sensor to the surrogate target and the first sensor to the desired target in response to an amount of slewing of the first sensor, the processor further operable to determine information indicative of a position of the desired target in real time during slewing, wherein the information indicative of the position comprises a distance from the first sensor to the desired target and the amount of slewing of the first sensor from the surrogate target to the desired target; and
    a network operable to couple the surrogate target to the first sensor to share the known remote location. from the second sensor with the first sensor such that the first sensor receives the remote location in the form of GPS information, representing the remote location, in a geo-registered map;
    wherein the processor further comprises scene based image processing circuitry operable to determine the amount of slewing of the first sensor from the surrogate target to the desired target by counting a number of pixels in the viewfinder of the first sensor between the surrogate target and the desired target in real time during the stewing of the first sensor.

4. The apparatus of claim 3, wherein:
    the device operable to determine the distance from the first sensor to both the surrogate target and the desired target is a laser range finder.

5. A system for precision collaborative targeting, comprising:
    a network of sensors operable to improve Far Target Location (FTL) accuracy of a GPS Interferometer Subsystem, the network of sensors comprising plurality of sensors including a first sensor and a second sensor as part of a surrogate target comprising a vehicle operable to be mobile;

an FTL sensor platform that comprises the first sensor and the GPS Interferometer Subsystem, the first sensor operable to receive a geo-registered map comprising GPS information indicative of a current location of the FTL sensor platform, the network of sensors operable to share GPS position of each sensor in the network of sensors, including GPS position of the FTL sensor platform, and GPS position of the second sensor, the first sensor further operable to be slewed toward a desired target at an unknown remote location, a view of a viewfinder of the first sensor initially directed at the surrogate target at a known remote location as determined by the GPS position of the second sensor, wherein the viewfinder comprises a plurality of pixels and wherein the FTL sensor platform further comprises:

a range finder operable to determine a distance from the first sensor to both the surrogate target and the desired target; and a processor operable to determine an azimuth pointing angle between the first sensor to the surrogate target and the first sensor to the desired target in response to an amount of slewing of the first sensor, wherein the processor comprises scene based electronic scene stabilization image processing circuitry operable to determine the amount of slewing of the first sensor from the surrogate target to the desired target by counting a number of pixels, in real time during the slewing, in the view of the viewfinder between the surrogate target and the desired target.

6. The system of claim 5, wherein the processor is further operable to determine information indicative of a position of the desired target from the distance from the first sensor to the desired target and the amount of slewing of the view of the first sensor from the surrogate target to the desired target.

7. The system of claim 5, wherein the FTL sensor platform further comprises an interface operable to receive messages indicating a location of the second sensor.

8. The system of claim 7, wherein the interface is operable to send and receive Join Variable Message Format messages.

9. The system of claim 5, wherein the FTL sensor platform further comprises a memory to maintain a listing of information to determine positions of several known locations.

10. The system of claim 5, wherein the GPS Interferometer Subsystem comprises two GPS antennas.

11. The system of claim 5, wherein the system comprises multiple surrogate targets.

* * * * *

UNITED STATES PATENT AND TRADEMARK OFFICE
CERTIFICATE OF CORRECTION

PATENT NO. : 9,817,099 B2
APPLICATION NO. : 12/271481
DATED : November 14, 2017
INVENTOR(S) : Svane et al.

Page 1 of 1

It is certified that error appears in the above-identified patent and that said Letters Patent is hereby corrected as shown below:

In the Claims

In Column 6, Line 47, in Claim 3, delete "location." and insert --location-- therefor In Column 7, Line 12, in Claim 5, delete "toward" and insert --towards-- therefor Signed and Sealed this
Twenty-eighth Day of April, 2020

Andrei Iancu
*Director of the United States Patent and Trademark Office*